United States Patent [19]

Koontz

[11] Patent Number: 4,894,513
[45] Date of Patent: Jan. 16, 1990

[54] HEATABLE WINDSHIELD TEMPERATURE CONTROL

[75] Inventor: Harry S. Koontz, Penn Hills Township, Allegheny County, Pa.

[73] Assignee: PPG Industries, Inc., Pittsburgh, Pa.

[21] Appl. No.: 215,147

[22] Filed: Jul. 5, 1988

[51] Int. Cl.$^4$ ............................................. H05B 1/02
[52] U.S. Cl. .................................... 219/203; 219/543; 219/494; 219/499
[58] Field of Search ................. 219/201,543, 203, 544, 219/212, 494, 497, 499, 501, 507–509; 307/117, 265, 271

[56] References Cited

U.S. PATENT DOCUMENTS

| | | | |
|---|---|---|---|
| 3,789,191 | 1/1974 | Spindler | 338/24 |
| 3,789,192 | 1/1974 | Spindler | 219/522 |
| 4,057,671 | 11/1977 | Shoop | 428/208 |
| 4,277,672 | 7/1981 | Jones | 219/203 |
| 4,323,726 | 4/1982 | Criss et al. | 174/68.5 |
| 4,434,358 | 2/1984 | Apfelbeck et al. | 219/203 |
| 4,543,466 | 9/1985 | Ramus | 219/203 |
| 4,565,919 | 1/1986 | Bitter et al. | 219/509 |
| 4,577,094 | 3/1986 | Mil | 219/212 |
| 4,610,771 | 9/1986 | Gillery | 204/192.1 |
| 4,668,270 | 5/1987 | Ramus | 65/106 |

Primary Examiner—M. H. Paschall
Attorney, Agent, or Firm—Andrew C. Siminerio

[57] ABSTRACT

A temperature control device for a heatable windshield which includes a temperature sensitive resistance member that extends into critical areas of the windshield to monitor the windshield temperature and prevent overheating. The voltage drop across the member is compared to a set voltage drop value as the windshield is powered and becomes heated. When the member's voltage drop exceeds the set value, the power to the heatable windshield is automatically interrupted to prevent overheating.

15 Claims, 1 Drawing Sheet

HEATABLE WINDSHIELD TEMPERATURE CONTROL

BACKGROUND OF THE INVENTION

1. Field of the Invention

This invention relates to an improvement in an electrically heatable transparency such as may be used in a vehicle having deicing, defrosting, or defogging capabilities, and in particular to an improvement in the temperature control of the heatable transparency to protect the transparency against overheating.

2a. Technical Considerations

It has been known to pass electric current through a transparent conductive coating on a transparency in order to raise its temperature. Generally the transparency includes a pair of substantially parallel bus bars on opposite sides of the area of the windshield to be heated. The bus bars have a low resistivity relative to the coating and are connected by leads to a power source to distribute current from the power source through the coating.

One mode of failure of heatable transparencies is overheating of the coating or bus bar. The overheating may result from passing current through a defective or damaged bus bar. Overheating may also result from a discontinuity or gap in the conductive film which may cause arcing. In addition, the relative position and length of the bus bars may effect the flow of the current through the conductive coating and Produce localized areas of elevated temperature, or "hot spots", in the transparency. Hot spots generally occur when the opposing bus bars are not of equal length so that there is increased current flow from the longer bus bar to the shorter bus bar. Automotive windshields are typically trapezoidal in shape and in order to heat the side portions of the windshield, the lower bus bar is extended into these areas. As a result, the length of the lower bus bar is greater than that of the upper bus bar and hot spots are produced near the ends of the upper bus bar. Overheating and arcing can damage the plastic interlayer or in severe cases damage the laminated transparency.

It would be advantageous to have capabilities to monitor the temperature of the heatable transparency so as to prevent overheating that may damage the transparency or render the entire heating system inoperative.

2b. Patents of Interest

U.S. Pat. Nos. 3,789,191 and 3,789,192 to Spindler teach a temperature sensor for use in an electrically heated, laminated window which includes a resistance filament wire wrapped around a core member. The sensor is encapsulated within a casing material which in turn is embedded within the plastic interlayer of the window. The casing material has a heat deflection temperature greater than the plastic interlayer so as to avoid fracture and shortening of the resistance filament against an electrically conductive coating during the high temperature and high pressure conditions of laminating.

U.S. Pat. No. 4,057,671 to Shoop, U.S. Pat. No. 4,323,726 to Criss et al., and U.S. Pat. Nos. 4,543,466 and 4,668,270 to Ramus teach a heated laminated window with an electroconductive coating or a wire grid extending between a pair of generally parallel bus bars. Current passes from one bus bar, through the coating or wire grid, to the opposite bus bar to heat the window.

U.S. Pat. No. 4,565,919 to Bitter et al. teaches a crack detector for an electrically conductive windshield. The circuit includes structure for monitoring the resistance of the conductive film of the windshield and interrupting power applied to the film when the resistance assumes a value indicative of element cracking.

U.S. Pat. No. 4,610,771 to Gillery teaches a transparent, multiple-layer film of metal and metal oxide layers for use as a high transmittance, low emissivity coating.

SUMMARY OF THE INVENTION

The present invention teaches an apparatus for and method of monitoring the temperature of a heatable windshield of the type including an electroconductive coating on a major surface of a glass ply of the windshield and first and second bus bars along opposing edge portions of the coating. A variable resistance type wire member, i.e., a wire whose resistance varies with its temperature, is positioned along selected portions of the windshield, preferably within the windshield, and electrically insulated from the coating and bus bars. The voltage drop across the wire member changes as its resistance changes in response to temperature changes of the heatable windshield. This voltage drop is monitored and acts on control facilities to prevent windshield overheating. For example, in one embodiment, the voltage drop is monitored and compared to a predetermined voltage drop level corresponding to the voltage drop across the wire member when its average temperature exceeds the allowable windshield temperature. When the wire member voltage drop level is at about the predetermined voltage drop level, a signal is activated and/or the power to the heatable windshield is terminated.

DETAILED DESCRIPTION OF THE DRAWINGS

DETAILED DESCRIPTION OF THE INVENTION

The present invention is described in combination with a laminated transparency comprised of two plies of glass bonded together by an interlayer of plastic but it should be understood that the present invention may be incorporated into any type of heatable transparency where the temperature of the transparency should be monitored.

Figure 1:
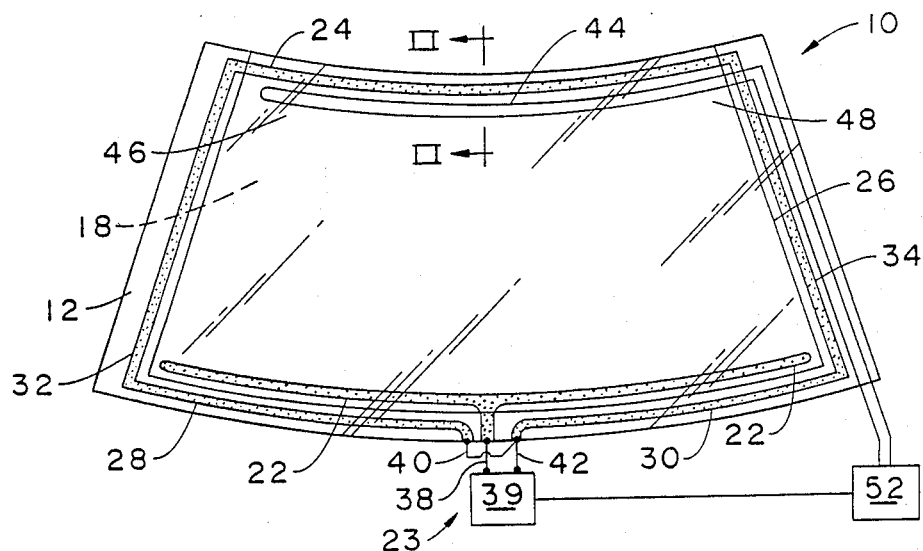
FIG. 1 is a schematic view of a heatable windshield incorporating features of the present invention.
Figure 2:
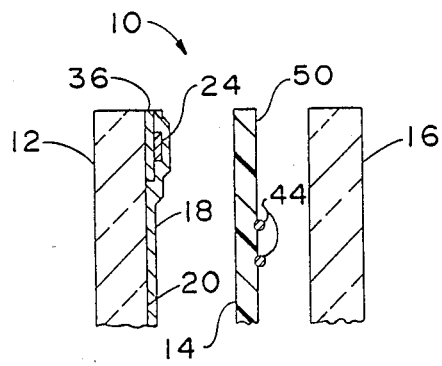
FIG. 2 is an exploded cross-sectional view taken along line 2—2 of FIG. 1.

Referring to FIGS. 1 and 2, the transparency 10 includes an outboard glass ply 12, i.e., the ply furthest from the vehicle interior, a plastic interlayer 14 which may be polyvinylbutural as is commonly used for laminated windshields, and an inboard sheet of glass 16. A heating arrangement 17 is provided to heat the transparency 10. Although not limiting in the present invention, in the arrangement 17 includes an electroconductive coating 18 preferably positioned on the inside surface 20 of the outboard ply 12. Various coatings may exhibit the necessary combination of transparency and electroconductivity to serve as the heating element for the transparency, but a preferred coating is that disclosed in U.S. Pat. No. 4,610,771 to Gillery, which teachings are hereby incorporated by reference. This coating comprises a film of silver between films of zinc stannate, each of which may be applied sequentially by magnetron sputtering. The silver acts as the conductive layer and the zinc stannate films serve to mask the reflectance of the silver. The coating exhibits appropriate resistivity for use as a heating element in a heatable windshield when the silver layer has a thickness of about, for example, 110 angstroms.

Although not limiting in the present invention, the electrical connections to the particular embodiment of the heatable windshield 10 illustrated in FIGS. 1 and 2 are made at terminal area 23 at the center of its bottom edge. A bottom bus bar 22 (shown only in FIG. 1) and top bus bar 24 are in contact with the coating 18. Line 26 indicates an edge of the coating 18 spaced from the sides and bottom edges of the transparency 10, leaving an uncoated margin along three sides. The uncoated marginal areas may be created by masking these selected portions of the transparency 10 during the coating process. Optionally, the entire glass sheet could be coated and the coating subsequently deleted from those areas. The uncoated marginal areas permit electrical connections to be made to the bus bar 24 from the terminal 23 without passing through the coating 18. The connection to the upper bus bar 24 of the windshield 10 includes a pair of conductive strips 28 and 30 extending in opposite directions along the bottom edge of the windshield 10 from the terminal area 23, and conductive side strips 32 and 34 extending along opposite side portions which connect strips 28 and 30, respectively, to opposite ends of upper bus bar 24. The bus bars and conductive strips may be made of a silver containing ceramic frit material fused to the glass 12, as is well known in the art and may be silk screened onto the glass surface 20. An opaque ceramic enamel border 36 (shown only in FIG. 2) may be applied on surface 20 of the glass ply 12 to hide the bus bars 22 and 24 and strips 28, 30, 32, and 34. The conductivity of the bus bars and conductive strips is chosen to be considerably greater than that of the coating 18. Electrical lead 38 connects the lower bus bar 22 to one pole of an electrical power source 39, and strips 32 and 34 leading to the upper bus bar 24 may be wired in common to the opposite pole of power source 39 by means of a jumper wire 40 and lead 42.

With continued reference to FIGS. 1 and 2, the temperature control device of the present invention includes a wire loop 44 within selected portions of the windshield 10. In particular, the wire 44 extends within the windshield 10 to a position where, based on the windshield design and experience, a hot spot is anticipated. Typically, hot spots are expected at locations 46 and 48. The wire loop 44 is a resistance type device, i.e., its resistance changes as its temperature changes. Although not limiting in the present invention, the wire loop 44 is preferably a blackened 34 to 36 gage iron nickel wire having a resistance that changes at a rate of 0.008 ohms/ft degree C. (0.026 ohms/m degree C.). In the particular embodiment illustrated in FIG. 1, a single wire loop extends through both hot spots 46 and 48 but it is understood that the wire loop 44 may extend only into a single hot spot and individual loops may be used at different locations within the windshield 10. The wire loop 44 is electrically isolated from the coating 18 so as to insulate the circuitry of the windshield heating system from the voltage drop comparator circuit 52 (shown in FIG. 3) of the windshield temperature sensor and prevent shorting of the circuit, as will be discussed later. The wire loop 44 is preferably positioned along the surface 50 of the interlayer 14 as shown in FIG. 2. As an alternative, the wire may be provided with an insulating cover or be embedded within the interlayer 14.

Figure 3:
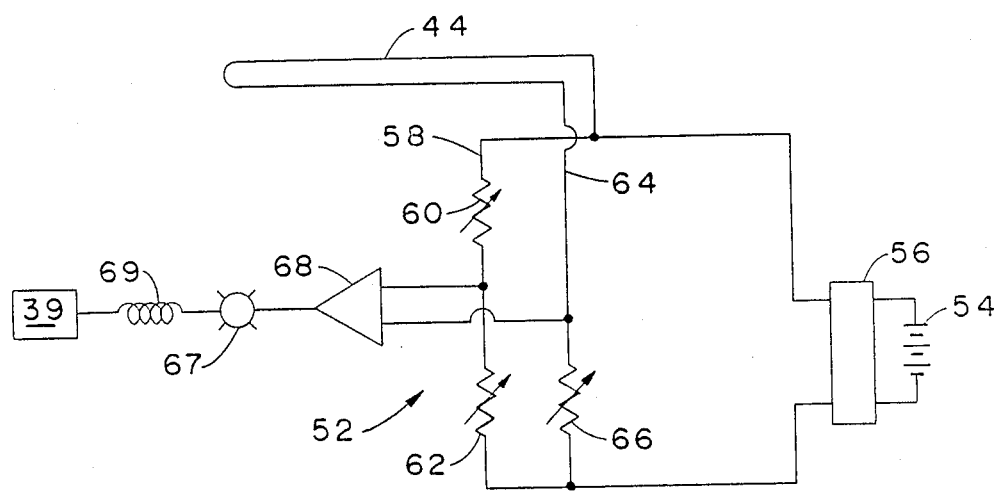
FIG. 3 is one particular embodiment of an electrical circuit having the temperature control sensor of the present invention.

Referring to FIG. 3, comparator circuit 52 monitors the temperature of the heatable windshield 10 based on the resistance of the wire 44 which changes as the temperature of the windshield 10 changes. When the average temperature of the wire 44 reaches a set value, circuit 52 will interrupt the power from power supply 39 to the windshield 10. In particular, power source 54 powers a regulator 56 to provide a constant voltage to the circuit 52. The wire loop branch 64 of circuit 52 includes the wire loop 44 and a resistor 66. The resistor 66 may be a fixed resistance resistor or an adjustable resistance resistor as shown in FIG. 3, which allows the circuit 52 to be finely tuned. As the temperature of the windshield 10 changes, the average temperature of the wire 44 changes. This in turn changes the resistance of the wire 44. Since resistor 66 has a fixed resistance, the voltage drop across the wire loop branch 64 will vary with the resistance of the wire loop 44. The voltage drop across the branch 64 is compared to the voltage drop across a set point branch 58 by comparator 68. Set point branch 58 includes a pair of resistors 60 and 62, which may be fixed resistance or adjustable resistance resistors, selected or adjustable to establish a reference voltage drop level corresponding to the voltage drop in branch 64 when the temperature of the windshield at the selected area is at a maximum level, e.g., 150 degrees F. (66 degrees C.).

In one particular embodiment of the invention, the resistance of the wire 44 increases as its temperature increases. When the windshield 10 is powered and begins to heat up, the average temperature of the wire loop 44 rises, increasing the wire loop's resistance. Since the resistance of resistor 66 is set and the resistance of the wire loop 44 increases as a result of the rise in its average temperature, the voltage drop across the wire loop branch 64 increases. The comparator 68 continuously compares the voltage drop across the wire loop branch 64 to that of the set point branch 58. If the temperature of the windshield 10 rises above the desired temperature so that the voltage drop across the wire loop branch 64 exceeds the predetermined voltage drop across the set point branch 58, a warning device 67 and/or a control relay 69 is activated to automatically interrupt the windshield power supply 39 to prevent the windshield 10 from overheating. The power cut-off may be set on a timer so that after a set time period, the windshield 10 is automatically reenergized, or it may be set up so as to require manual reenergizing by the vehicle operator.

In the particular embodiment of the invention discussed above, the wire loop 44 was a positive coefficient resistance type device, i.e., its resistance increased with an increase in its temperature but it would be obvious to one skilled in the art to use a device that has a negative coefficient, i.e., its resistance gets lower as its temperature increases. Specifically, as the temperature of the wire loop 44 increases, its resistance would decrease. The resistors 60 and 62 in the set point branch would be proportioned so as to establish a predetermined voltage drop level corresponding to the voltage drop across the wire loop branch 64 when the resistance of the wire loop 44 drops in response to its rise in temperature.

It should be appreciated that the disclosed temperature control arrangement may be used with other heatable transparency arrangements. For example, rather than using an electroconductive coating 18 to heat the transparency, a wire grid arrangement (not shown) as taught in U.S. Pat. No. 4,057,671 to Shoop, which teachings are incorporated by reference, may be used. As with the electroconductive coating arrangement, provisions must be made to electrically insulate the wire 44 from the heating wire grid to prevent shorting of the temperature sensor circuit and the windshield heating system circuit.

While this invention has been described in detail with particular reference to a preferred embodiment thereof, it is understood that variations and modifications can be effected within the spirit and scope of the invention as described hereinbefore and as defined in the following claims.

I claim:

1. In an electrically heatable transparent article including a dielectric substrate, an electroconductive coating on a surface of said substrate, and first and second spaced apart bus bars along opposing edge portions of said coating to pass a current from one of said bus bars through said coating to the other said bus bars, wherein current flow from said one of said bus bars through said coating to said other of said bus bars results in a selected portion of said coating having a higher temperature than the remaining portions of said coating, the improvement comprising:
    an electrically conductive member for sensing temperature changes wherein resistance of said member varies as the temperature of said selected portion of said coating varies;
    said member positioned within said transparent article and electrically insulated from said coating and in close proximity to said selected portion of said coating to sense temperature variations in said selected portions wherein resistance output of said member indicates the temperature of said selected portions of said coating.

2. The article as in claim 1 wherein said substrate comprises a lamination of at least one glass sheet and at least one plastic sheet.

3. The article as in claim 2 wherein said coating and said bus bars are between said glass sheet and said plastic sheet.

4. The article as in claim 3 wherein said electrically conductive member includes a temperature sensitive resistance member.

5. The article as in claim 4 wherein said resistance member is embedded in said plastic sheet.

6. The article as in claim 4 wherein said resistance member is a temperature sensitive wire.

7. The article as in claim 6 further including means to provide an electric current to said coating and said wire and means to sense the change in the resistance of said wire.

8. The article as in claim 7 wherein said sensing means further includes means to monitor the voltage drop across said wire and means to compare said voltage drop to a predetermined voltage drop.

9. The article as in claim 8 further including means to interrupt said electric current providing means in response to said comparing means.

10. The article as in claim 7 further including means responsive to said sensing means and acting on said current providing means to terminate said electric current.

11. A control for monitoring the temperature of selected portions of a heatable transparency of a type having a dielectric substrate, an electroconductive coating on a surface of said substrate, and first and second spaced apart bus positioned on opposing edge portions of said coating to pass current between said bus bars through said coating, wherein current flow between said bus bars through said coating results in a selected portion of said coating of having a higher temperature than remaining portions of said coating, comprising:
    a temperature sensitive resistance type device positioned within said transparency and insulated from said coating and extending along said selected portion of said coating wherein the voltage across said device varies as the temperature of said selected portion of said coating varies;
    means to monitor the voltage across said resistance device;
    means responsive to said monitoring means to interrupt current flow to said bus bars when said monitored voltage is at a predetermined level.

12. The control as in claim 11 wherein said responsive means includes means to compare said resistance device voltage to a predetermined voltage and means to interrupt said electric current to said transparency in response to said comparing means when said resistance device voltage has a predetermined relationship relative to said predetermined voltage.

13. The control as in claim 11 wherein said monitoring means include a sensor circuit including at least one resistor and said temperature sensitive resistance type device, a set point circuit including at least two resistors proportioned such that the voltage drop across said set point circuit corresponds to the voltage drop across said sensor circuit when said selected portion of said coating is at about a predetermined temperature and means to compare said sensor circuit voltage drop to said set point circuit voltage drop when current is provided to said bus bars and coating.

14. A method of monitoring the temperature of a heatable transparency of the type including a dielectric substrate, an electroconductive coating on a surface of said substrate, and first and second spaced apart bus bars along opposing edge portions of said coating to pass current between said bus bars through said coating, wherein current flow between said bus bars results in a selected portion of said coating having a higher temperature than remaining portions of said coating, comprising:
    providing a temperature sensitive resistive type member within said transparency and in close proximity to said selected portion of said coating, wherein voltage output of said device varies as the temperature of said selected portion of said coating varies; electrically insulating said member from said coating; providing current to said coating to heat said coating; providing current to said member;
    monitoring the voltage output of said member; and
    generating a signal when said voltage output has a predetermined value.

15. The method as in claim 14 further including the step of comparing said monitored voltage output to a predetermined voltage level value and wherein said generating step includes generating said signal when said monitored voltage output has a predetermined relationship to said predetermined voltage level value.

* * * * *